United States Patent
Chamberlin (10) Patent No.: US 8,575,814 B2
(45) Date of Patent: Nov. 5, 2013

(54) CONDUCTOR INSULATION ARRANGEMENT FOR ELECTRIC MACHINE WINDING

(75) Inventor: Bradley D. Chamberlin, Pendleton, IN (US)

(73) Assignee: Remy Technologies, LLC, Pendleton, IN (US)

( * ) Notice: Subject to any disclaimer, the term of this patent is extended or adjusted under 35 U.S.C. 154(b) by 206 days.

(21) Appl. No.: 13/051,954

(22) Filed: Mar. 18, 2011

(65) Prior Publication Data

US 2012/0235534 A1 Sep. 20, 2012

Related U.S. Application Data

(63) Continuation-in-part of application No. 13/051,931, filed on Mar. 18, 2011.

(51) Int. Cl.
*H02K 3/34* (2006.01)
*H02K 3/00* (2006.01)

(52) U.S. Cl.
USPC .................. 310/215; 310/214; 310/180

(58) Field of Classification Search
USPC ......... 310/214, 215, 194, 179, 180, 184, 195, 310/198, 208
IPC ....................... H02K 3/34,3/48, 3/32
See application file for complete search history.

(56) References Cited

U.S. PATENT DOCUMENTS

| | | | |
|---|---|---|---|
| 2,796,543 A * | 6/1957 | Dunn, Jr. .................. 310/202 |
| 6,147,430 A | 11/2000 | Kusase et al. |
| 6,147,432 A | 11/2000 | Kusase et al. |
| 6,242,836 B1 | 6/2001 | Ishida et al. |
| 6,333,573 B1 | 12/2001 | Nakamura |
| 6,335,583 B1 | 1/2002 | Kusase et al. |
| 6,969,940 B2 | 11/2005 | Dalrymple et al. |
| 7,005,772 B1 | 2/2006 | Frederick et al. |
| 7,132,776 B2 | 11/2006 | Tagami et al. |
| 7,348,705 B2 | 3/2008 | Cai et al. |
| 7,701,678 B2 | 4/2010 | Dooley |
| 2005/0206263 A1 | 9/2005 | Cai et al. |
| 2011/0012474 A1 | 1/2011 | Levit et al. |
| 2011/0095641 A1* | 4/2011 | Rhoads .................. 310/215 |

FOREIGN PATENT DOCUMENTS

| | | | |
|---|---|---|---|
| JP | 11262209 A | * | 9/1999 |
| JP | 2005045971 A | * | 2/2005 |

OTHER PUBLICATIONS

Machine Translation, JP 11262209 A, Sep. 24, 1999.*
Machine Translation, JP 2005045971 A, Feb. 17, 2005.*

* cited by examiner

*Primary Examiner* — Tran Nguyen
*Assistant Examiner* — Thomas Truong
(74) *Attorney, Agent, or Firm* — Maginot, Moore & Beck LLP (57) ABSTRACT

An electric machine includes a core with a plurality of slots. A plurality of conductors are positioned in each of the plurality slots, with each slot including an equal number of conductors. At least one slot liner is also positioned in each of the plurality of slots. Each slot liner provides at least one slot liner channel in the associated slot, and each of the plurality of conductors extend through one of the slot liner channels. Differing numbers of slot liner channels are provided in the plurality of slots. Accordingly, all slots have the same number of conductors positioned therein, but all slots do not have the same number of slot liner channels.

20 Claims, 10 Drawing Sheets

CONDUCTOR INSULATION ARRANGEMENT FOR ELECTRIC MACHINE WINDING

CROSS-REFERENCE TO RELATED APPLICATIONS

This application is a continuation-in-part of U.S. patent application Ser. No. 13/051,931, filed Mar. 18, 2011.

FIELD

This application relates to the field of electric machines, and particularly to electric machine conductors.

BACKGROUND

Segmented windings are commonly used in modern electrical machine applications, such as in hybrid-electric vehicles. These windings typically comprise a plurality of segmented conductors which include in-slot portions and ends that are connected together. The conductors are positioned in the slots of a laminated core portion of the electric machine (e.g. stator slots), and the ends of the conductors are connected to form windings for the electric machine.

Segmented conductors for electric machines are often provided in the form of "U-shaped" conductors which include two legs and a central U-turn portion extending between the legs. These U-shaped conductors may also be referred to herein as "U-shaped bars" or conductors with "U-turn portions". The terms "U-shaped conductor", "U-shaped bar" and "U-turn portion" as used herein refer to electrical conductors or conductor portions where the axial direction of the conductor changes by about 180°. However, these terms are not limited to conductors or conductor portions that form a perfect "U" shape.

U-shaped conductors are typically created by bending and twisting wire bars into U-shaped conductors with two legs and a U-turn between the legs. The two legs are separated by a given span which allows the conductor to extend across a number of stator slots by virtue of the U-turn alone. The legs of the conductors are then inserted into the slots of the core from an insertion end of the core. Following insertion of the conductors into the slots of the core, the bend portions (i.e., the U-turn portions) are positioned on one side of the core (i.e., the "insertion side") and the leg ends extend from the other side of the core (i.e., the "connection side" or "weld side"). The legs ends may then be bent to appropriate positions, often with a first leg typically bent in one direction and another leg bent in the opposite direction such that the entire segmented extends a given slot span (e.g., 12 slots). Finally, the tips of the leg ends are connected together at the connection side of the stator to complete the windings. These connections include adjacent leg ends that are directly aligned and joined together (e.g., by welding), non-adjacent leg ends that are connected through jumper wires, and terminal connections. Together, the connected conductors form the complete winding arrangement.

Although the conductors are connected together at their ends, care must be taken to ensure that adjacent conductors do not touch each other and short-circuit the designed winding arrangement. Accordingly, a slot liner comprised of an electrical insulation material is typically provided within the slots of the stator in order to electrically insulate the conductors from the stator core. The conductor itself may also have an insulation coating that covers the conductor within and outward of the stator core.

Figure 11A:
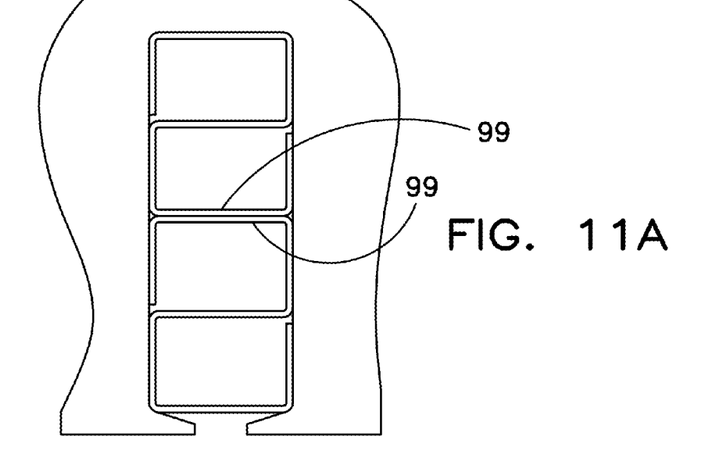
FIG. 11A shows a cross-sectional view of a slot with an "S" shaped slot liner positioned therein.

Care must be taken when the windings are assembled on the stators to avoid electrical shorts between conductors or between a conductor and the lamination steel of the stator core. Electrical shorts between the conductors and the lamination steel often result from manufacturing imperfections in the lamination slot geometry, imperfections in the conductor, and/or inadequate slot liner insulation. In electric motor applications where a U-shaped conductor is used, the slot liner may take the form of an "S", as shown in FIG. 11A. With this arrangement, the conductor is situated in each pocket (i.e., axial channel) of the "S" so that each conductor is isolated from the adjacent conductors. However, openings existing between the slot liner and the inner surface of the stator slot. These openings create a potential arc path for a short to occur if the conductor has been damaged or has manufacturing imperfections.

Figure 11B:
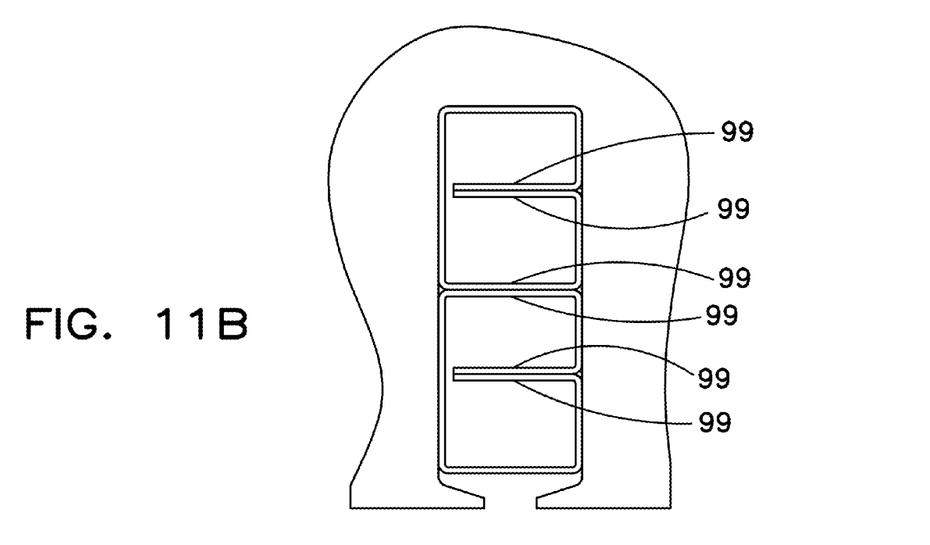
FIG. 11B shows a cross-sectional view of a slot with "B" shaped slot liner positioned therein.

Another slot liner constructions that has been used is a slot liner in the form of a "B", as shown in FIG. 11B. However this form factor requires additional layers of unnecessary slot liner paper to be used (e.g., see double layer 99 in FIG. 11B) to be used between the conductors. This additional liner layer occupies space that could have been used for an increased volume of copper needed for a high slot-fill ratio, which is desired for increased machine performance. It will also be noted that additional layers between conductors are also required with "S" shaped slot liners when four or more conductors are positioned in each slot, and each conductor must be insulated from its adjacent conductors (e.g., see double layer 99 in FIG. 11A).

Accordingly, it would be advantageous to provide an insulation arrangement for electric machines with segmented conductors which provides increased protection from electrical shorts to ground while also providing for a high slot-fill ratio. It would be advantageous if such insulation arrangement could be provided easily and at relatively low cost to the manufacturer.

SUMMARY

In accordance with one embodiment of the disclosure, there is provided an electric machine comprising a core with a plurality of slots. A multi-phase winding arrangement is positioned on the core. The winding arrangement is formed from a plurality of conductors with an equal number of conductors positioned in each of the plurality of slots. Each of the conductors is associated with a phase of the multi-phase winding arrangement. Conductors in a first group of slots are associated with a first number of phases of the multi-phase winding arrangement, and conductors in a second group of slots are associated with a second number of phases of the multi-phase winding arrangement. At least one slot liner with at least one slot liner channel is positioned in each of the plurality of slots. The number of slot liner channels in the first group of slots is equal to the first number of phases associated with the first group of slots, and the number of slot liner channels in the second group of slots is equal to the second number of phases associated with the second group of slots. In at least one embodiment, the electric machine may be a three-phase winding arrangement, wherein the first number of phases is one phase of the three-phase winding arrangement, and the second number of phases is two phases of the three-phase winding arrangement.

In one embodiment, a method of making an electric machine includes inserting slot liners providing slot liner channels into the slots of a stator core such that a first number of slot liner channels is positioned in a first group of slots and a second number of slot liner channels is positioned in a second group of slots, wherein the first number is different than the second number. The method further includes inserting a plurality of conductors into the plurality of slot liner channels and joining adjacent connection ends of the plurality of conductors.

In at least one embodiment, an electric machine includes a core with a plurality of slots. A plurality of conductors are positioned in each of the plurality slots and at least one slot liner is positioned in each of the plurality of slots. Each slot liner provides at least one slot liner channel in each of the plurality of slots, and each of the plurality of conductors extend through one of the slot liner channels. Differing numbers of slot liner channels are provided in the plurality of slots. For example, in one embodiment, a single slot liner channel is provided in each slot of a first group of slots and two slot liner channels are provided in each slot of a second group of slots.

The above described features and advantages, as well as others, will become more readily apparent to those of ordinary skill in the art by reference to the following detailed description and accompanying drawings. While it would be desirable to provide a conductor insulation system for an electric machine that provides one or more of these or other advantageous features, the teachings disclosed herein extend to those embodiments which fall within the scope of the appended claims, regardless of whether they accomplish one or more of the above-mentioned advantages.

DESCRIPTION

Figure 1:
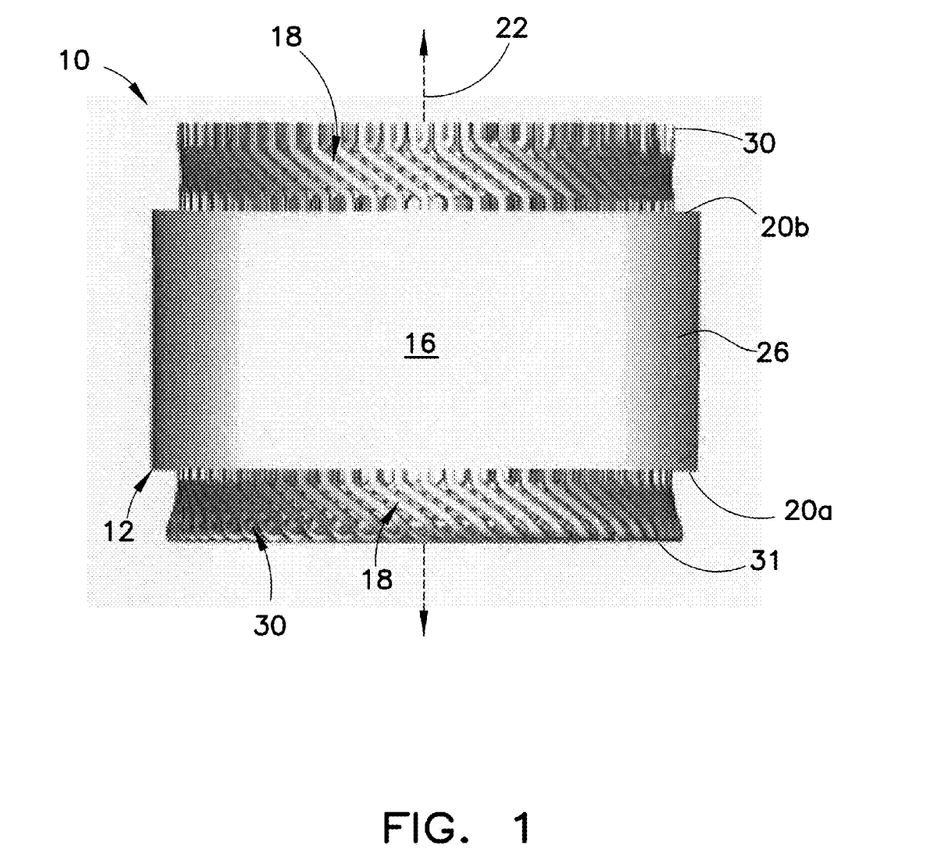
FIG. 1 shows a side view of an embodiment of a core of an electric machine with a winding positioned on the core.
Figure 2:
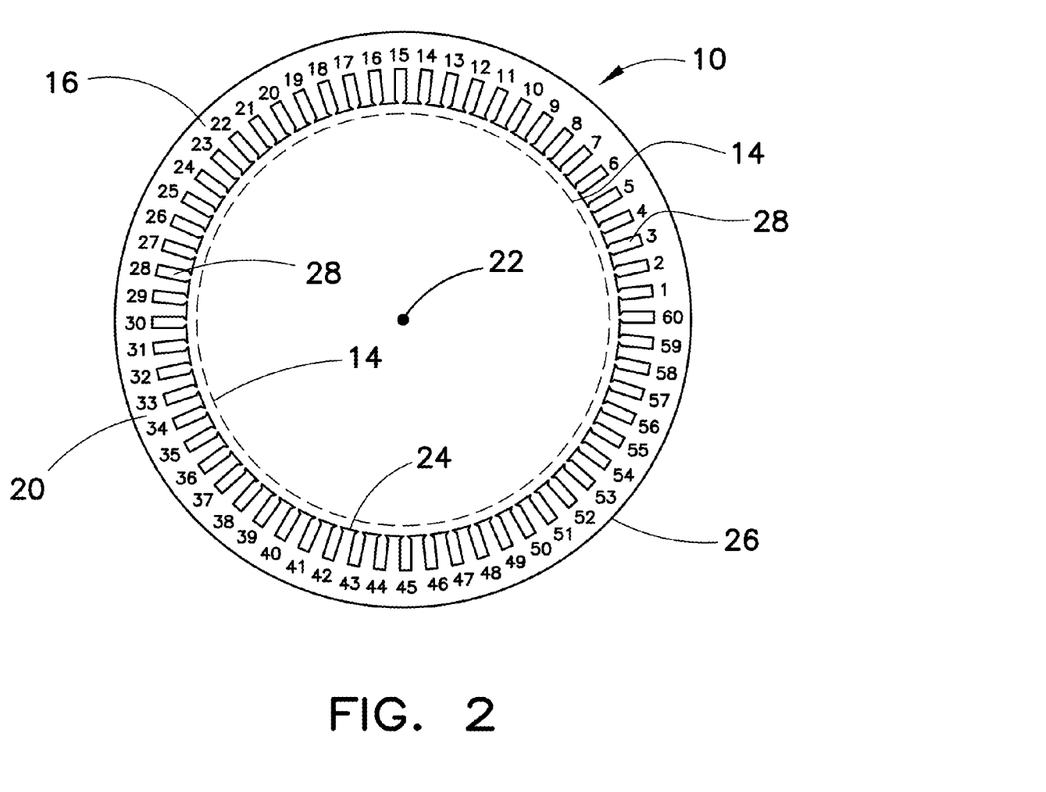
FIG. 2 shows a diagrammatic top view of the core of FIG. 1.

With general reference to FIGS. 1 and 2, an electric machine 10 includes a stator 12 and a rotor 14 (represented in FIG. 2 by dotted lines). The stator 12 includes a core 16 and a winding arrangement 18 positioned on the stator core 16. The stator 12 is magnetically coupled to a rotor through the winding arrangement 18. As explained in further detail below, the winding arrangement 18 is electrically insulated from the core 10 by a plurality of insulation members 40 and 50.

The stator core 16 is comprised of a ferromagnetic material and is typically formed from a plurality of steel sheets that are stamped in the shape of the core 16 and stacked upon one another to form a lamination stack. The stator core 16 (which may also be referred to herein as the "stator lamination" or "lamination stack") is generally cylindrical in shape as defined by a center axis 22, and includes an inner perimeter surface 24 and an outer perimeter surface 26. When the stator core 16 is viewed in an axial direction from an end 20, as shown in FIG. 2, the stator core 16 has a substantially circular or disc shape.

Figure 4:
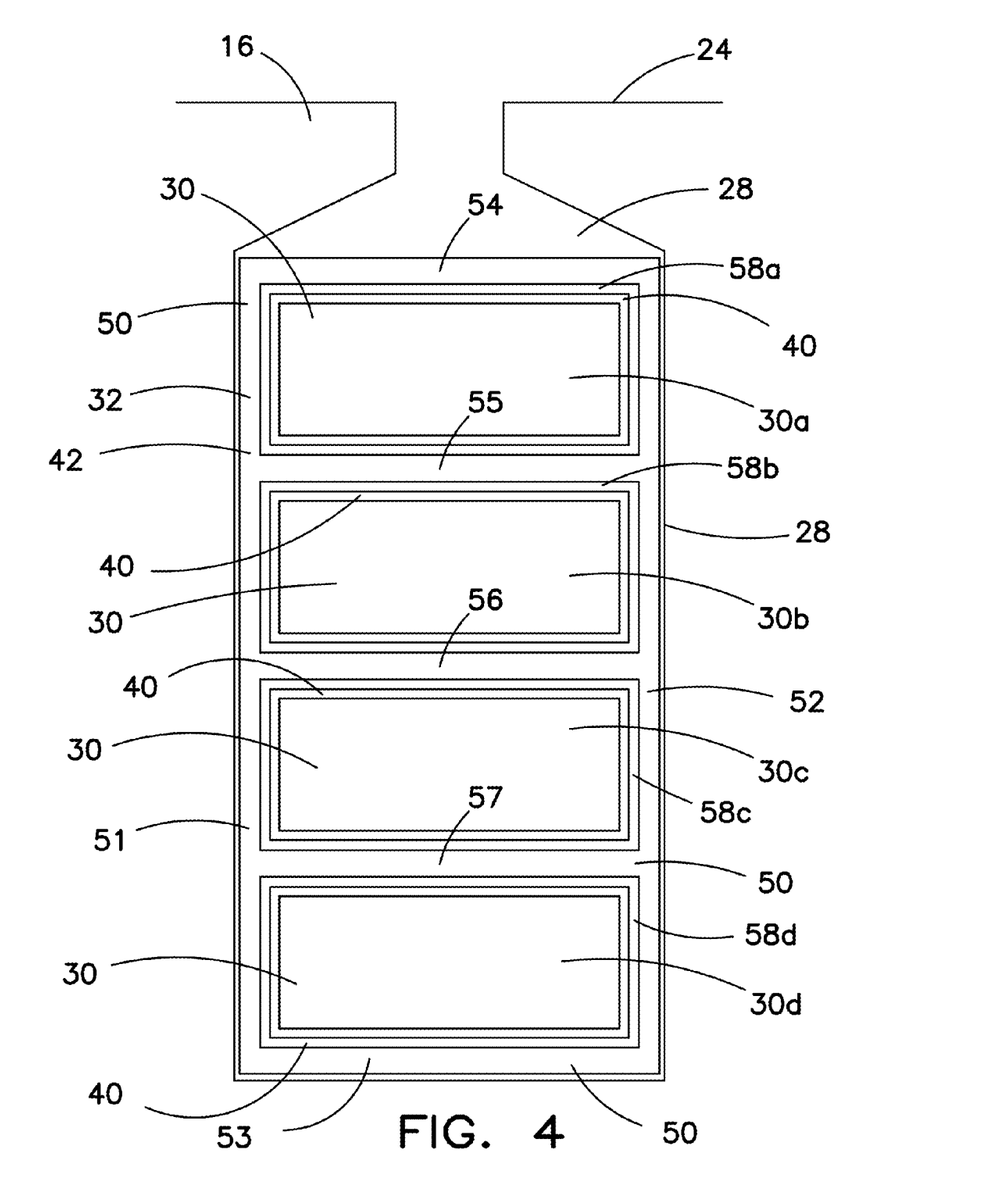
FIG. 4 shows a diagrammatic cross-sectional view of a slot in the core of FIG. 1.

A plurality of axial slots 28 are formed in the stator core 16 between the inner perimeter surface 24 and the outer perimeter surface 26. In the embodiment of FIG. 2, the stator core 16 includes sixty total slots 28 (which are numbered 1-60 in the diagram of FIG. 2). In other embodiments, the stator core 16 may include more slots or fewer slots. The slots 28 may be semi-closed slots in the stator core 16, as shown in FIGS. 2 and 4, such that each slot 28 has a smaller diameter near the inner perimeter surface 24 than the diameter closer to the outer perimeter surface 26. Openings to the semi-closed stator slots 28 are provided through the inner perimeter surface 24 as well as the ends 20 of the stator core 16.

A plurality of segmented conductors 30 are positioned in the slots 28 of the stator 10. When the conductors 30 are connected together they form the winding arrangement 18 on the stator core 16. The conductors are inserted into the stator core 16 from an insertion side 20a (which may also be referred to herein as the "insertion end") of the stator core 16, and the conductors 18 are welded or otherwise joined together at a weld side 20b (which may also be referred to herein as the "weld end") of the stator core 16.

Figure 3:
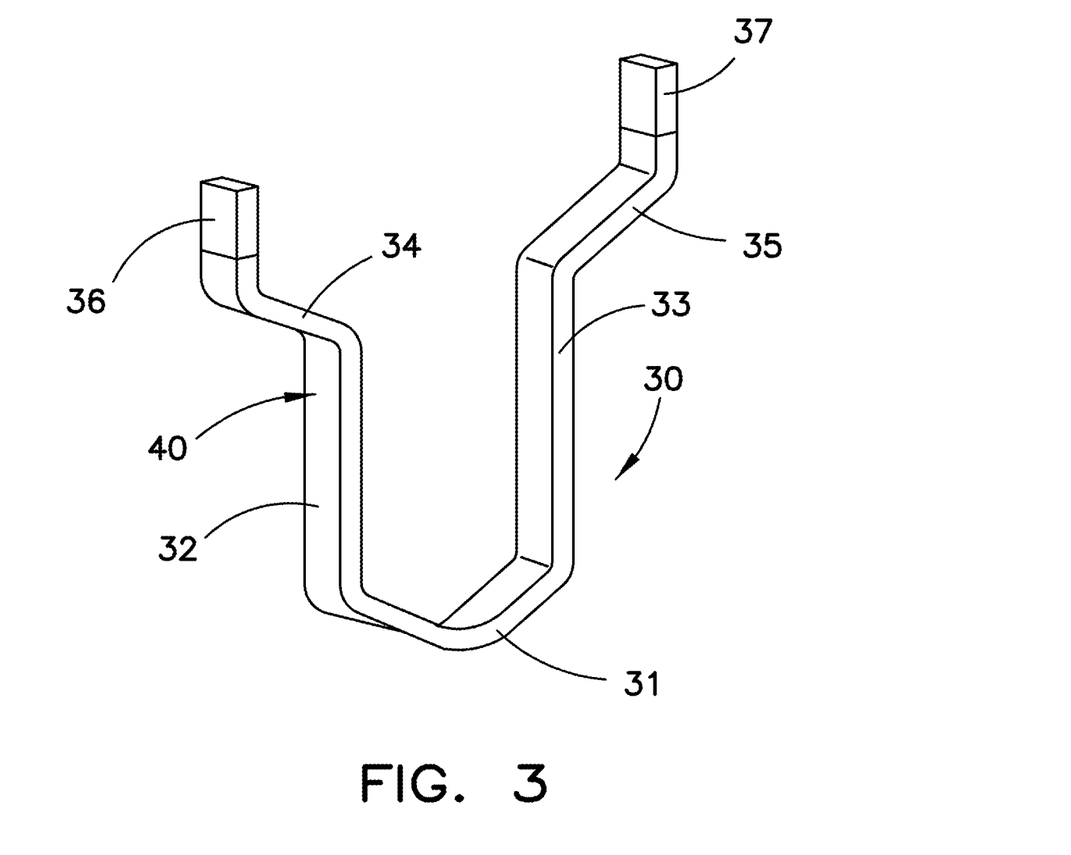
FIG. 3 shows a perspective view of a segmented conductor for the electric machine winding of FIG. 1.

An exemplary U-shaped segmented conductor 30 of rectangular cross-section is shown in FIG. 3. The segmented conductor 18 includes two in-slot portions 32 and 33 connected by a U-turn portion 31. Each in slot portion 32, 33 is joined to an associated connection end 34, 35. Tips 36, 37 are provided on each connection end 34, 35. Each tip 36, 37 is connected to the tip of another conductor such that the conductors together form the winding arrangement 18 on the stator core 16. An exemplary winding arrangement is shown in U.S. Pat. No. 7,622,843, issued Nov. 24, 2009, the contents of which are incorporated herein by reference.

Each conductor 30 is coated with a thin layer of insulating material 40 (as best shown in the cross-sectional view of FIG. 4). The insulating material 40 may be provided by a resin material, such as enamel, that is bonded to the surface of the conductor 30 by any of various methods known in the art. The resin material provides a coating of insulating material 40 covers the entire conductor 30 from one connection end 34 to the other connection end 35. However, the enamel coating 30 does not cover the tips 36, 37 of the conductor 30 in order to facilitate connection of the tips.

Each segmented conductor 30 is generally formed from a straight conductor segment that is bent to the shape shown in FIG. 3 after the conductor is inserted into the slots of the core 16. In particular, before a conductor segment is inserted into the stator slots 28, a machine bends a generally straight conductor segment to create the U-turn portion 31 with the in-slot portions 32, 33 positioned in parallel at opposite sides of the U-turn portion 31. At this time, the connection ends 34, 35 extend straight out from the in-slot portions 33, 34. After the U-turn portion 31 is created, the conductor 30 is inserted into the slots of the stator core 16. The connection ends 34, 45 are first inserted into the slots 28 from the insertion side 20a (see FIG. 1) of the stator core 16, with the in-slot portions 32, 33 following the connection ends 34, 35 through the slots 28. Once placed in the stator core 16, the in-slot portions 32, 33 of a given conductor 30 are positioned in different slots 16 of the stator. The connection ends 34, 35 extend from the weld side 20b (see FIG. 1) of the stator, opposite the U-turn portions 31 which extend from the insertion side 20a. After being inserted in the stator, the connection ends 34, 35 are bent by a machine in opposite directions by a predetermined distance. Thereafter, the tip 36, 37 of each connection end 34, 35 of a conductor 30 is directly connected to an adjacent tip 36, 37 on another conductor 30. The connection of the tips 36, 37 may be accomplished in any number of ways such as welding, brazing, or other methods known in the art. By connecting the segmented conductors in this fashion, complete windings 18 are formed on the stator core 16. Although the conductor segments 30 have been described herein as being generally U-shaped and connected at one end 20b of the stator core 16, it will be recognized that in other embodiments the conductor segments may be provided in different forms, including conductor segments with only a single in-slot portion and two connection ends that are connected to other conductors at opposite sides of the stator core 16. Moreover, in a single embodiment, U-shaped conductors may be utilized along with non-U-shaped conductor segments to complete the winding arrangement.

With particular reference to FIG. 4, an enlarged cross-sectional view of one of the slots 28 of the stator core 16 is shown with the segmented conductors 30 placed in the stator 12. In the exemplary embodiment of FIG. 4, the segmented conductors 30 have a rectangular cross-section and four conductors 30a-30d are placed in each slot 28. In other embodiments, the conductors 30 may have a different shape and more or less conductors may be placed in each slot 28. Each conductor 30 is separated from neighboring conductors in the slot 16 by at least one insulation layer, as described in further detail below.

With continued reference to FIG. 4, each conductor 30 in a slot 28 is separated from adjacent conductors 30 and the stator core 16 by at least one layer of insulation material within the slot 28. In some embodiments, including the embodiment of FIG. 4, each conductor 30 is separated from adjacent conductors by at least two layers of insulation material within the slot. The first layer of insulation material may be provided by the enamel or other insulative coating 40 that is bonded to the surface of the conductors 30, as described above. The second layer of insulation material may be provided by a slot liner 42 that is positioned within the slot.

Figure 5:
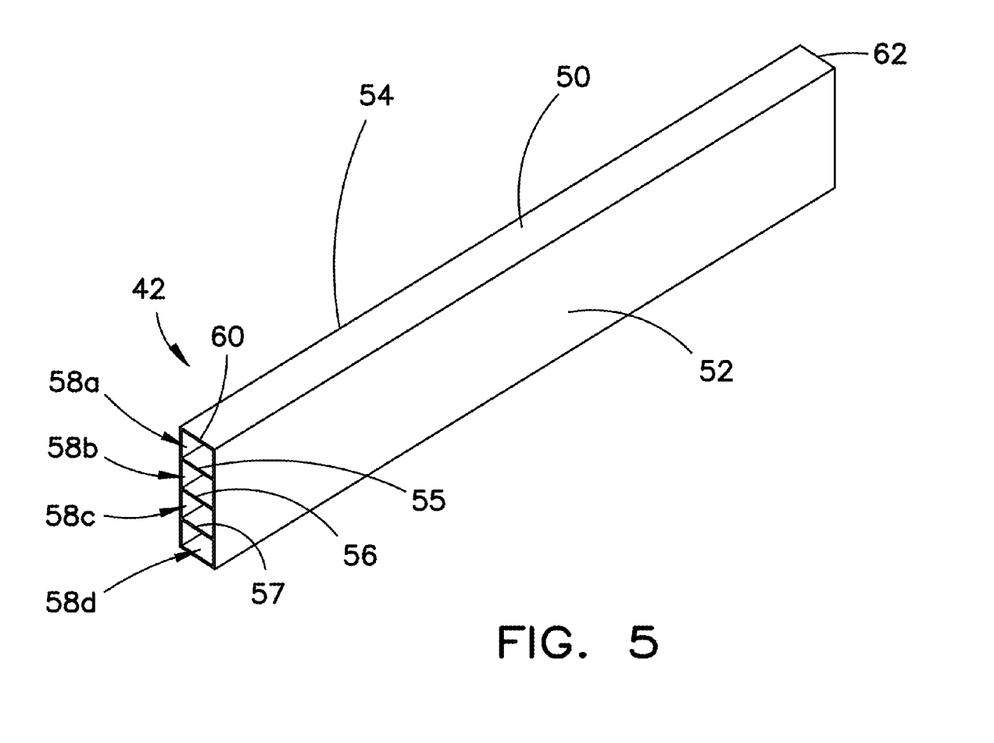
FIG. 5 shows a perspective view of a insulation tube for the electric machine of FIG. 1.

With reference now to FIGS. 4 and 5, an exemplary slot liner 42 is shown in the form of an insulation tube 50. The insulation tube 50 provides the second insulation layer for the conductors 30 in the slot 28. The insulation tube 50 has a generally block shape with a rectangular cross-sectional perimeter. The insulation tube 50 includes two circumferential perimeter walls 51, 52 and two radial outer walls 53, 54. In the embodiment of FIGS. 4 and 5, the insulation tube 50 also includes a plurality of inner walls 55, 56 and 57. Together, the circumferential perimeter walls 51, 52, radial outer walls 53, 54, and inner walls 55, 56 and 57 provide four elongated channels 58a-58d within the insulation tube 50. Each elongated channel 58a-58d extends from one end 60 to an opposite end 62 of the tube. Openings to the channels 58a-58d are provided at both the first end 60 of the insulation tube 50 and the opposite end 62 of the tube. However, the slot liner channels 58a-58d are closed along their length such that no openings are provided along the length of the tube 50 between ends 60 and 62. Accordingly, walls 51-54 are complete and void of openings. Additionally, walls 55-57 between the channels 58a-58d are also complete and void of openings.

The insulation tube 50 is situated in the slot 28 such that the walls 51-57 extend in the axial direction (i.e., in the direction of axis 22 shown in FIG. 1) along the entire length of the slot 28 (i.e., from the insertion end 20a to the weld end 20b of the stator core 16). Each of the plurality of insulation tubes may extend slightly out of the associated slot in the axial direction. For example, each insulation tube 50 may extend a length out of the slot that is less than 10% of the total length of the insulation tube. Each conductor 30a-30d in the slot 28 extends through one of the channels 58a-58d of the insulation tube 50. Accordingly, the insulation tube 50 insulates the conductors 30a-30d from contact with the stator core 16 within the slot 28. Additionally, because the insulation tube 50 encompasses all axial sides/edges of the conductors within in the slot 28 in the embodiment of FIGS. 4 and 5, the insulation tube 50 also insulates the individual conductors 30a-30d from each other.

As noted above, with the tubular type construction of the slot liner 42, the multiple conductors 30a-30d in the slot are 100% isolated from the walls of the slot 28 on all sides, as there are no openings in the walls 51-57, as is typical with some prior art slot liners (see FIG. 11A). Moreover, there is no overlap of insulation material of the slot liner 42 as is typical with may prior art slot liners (see 99 in FIGS. 11A and 11B), and no excess material is required. This allows for an increased form factor/slot fill to be achieved, all while isolating the conductor within the slot.

Figure 6:
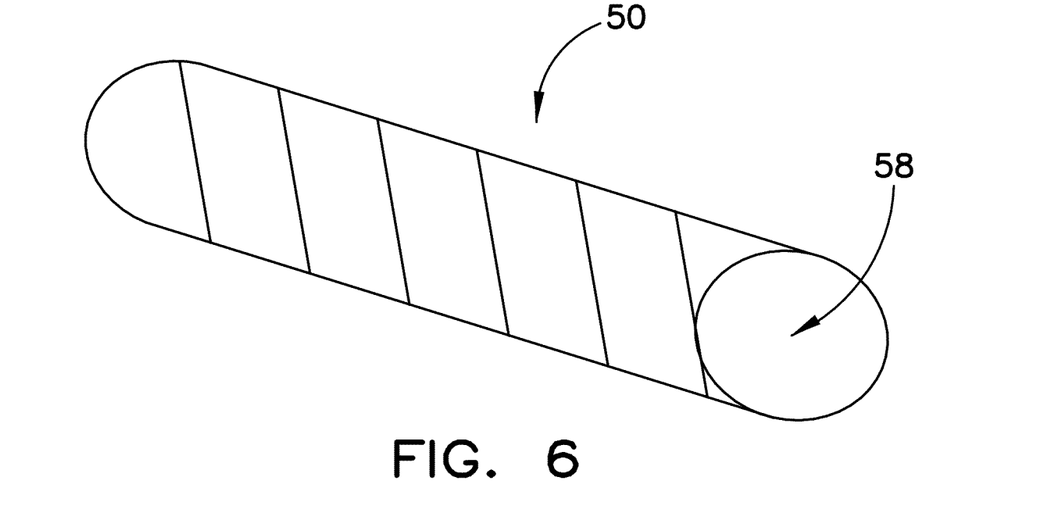
FIG. 6 shows a diagram illustrating of a spiral wound embodiment of the insulation tube of FIG. 5.

The insulation tube 50 can be constructed in a variety of manners. For example, the insulation tube 50 may be formed from an extrusion molding process to provide a uniform integral piece. As another example, the insulation tube 50 may be formed by wrapping a sheet of insulative material for the slot liner 42 in a helix to form the tube 50, as illustrated in FIG. 6. The helix wrap embodiment typically includes an overlap between respective layers to build the proper wall thickness for the desired dielectric strength for the application. Various adhesives and filler papers can be used to help secure edges of the sheet to itself to form the tube or to help secure adjacent tubes to form a complete tube. Adhesives and filler papers may also be used to provide an avenue for varnish to wick into the tube during a varnishing step (such as a trickle, dip, vacuum impregnation or other comparable process).

Figure 7:
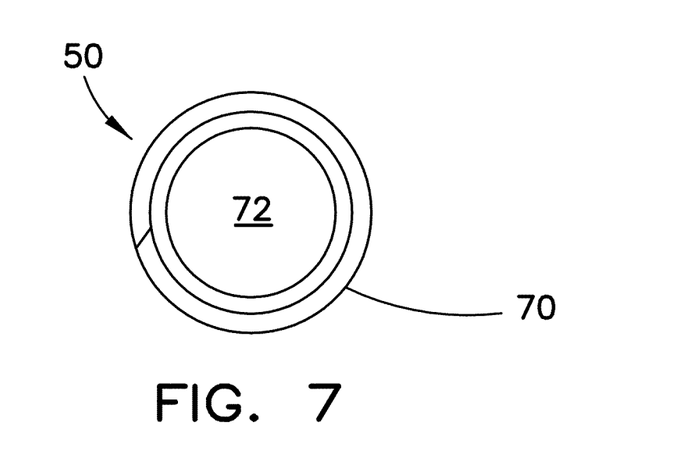
FIG. 7 shows a cross-sectional view of the insulation tube of FIG. 6.

Exemplary materials that can be used for the construction of the insulation tube 50 include those materials with high dielectric strengths, such as mylar and polyimide films. When thin filmed, high dielectric materials are used, the thermal transfer from the conductor 30 to the lamination stack 16 can be improved. Additionally, filler paper materials such as meta-aramid materials and the like can be used in combination with the high dielectric materials. These materials assist in providing a means for varnish adhesion between the conductor 30 and slot liner 42, or the slot liner 42 and the stator lamination 16. These materials can be either placed on the inside, outside, or both surfaces of the high dielectric material. For example, FIG. 7 shows a cross-sectional view of a spiral wound tubular slot liner 42 with an outer layer 70 comprised of a polyamide material and an inner layer 72 comprised of meta-aramid material. The filler paper materials 72 can help add mechanical column strength to the slot liner 42 to help prevent buckling of the slot liner 42 during handling or insertion of the conductors 30 into the stator slots 28 and the channels 58 of the insulation tube 50.

The tubular slot liners 42 disclosed herein are particularly adapted for use in automotive vehicle applications, including electric drive motors for hybrid electric vehicles. In such electric drive motors, the dimensions of the rectangular slot liner of FIG. 4 may be about 5.15 mm×14.3 mm, with each channel 58 about 4.60 mm×3.26 mm. This dimension allows the slot liner 42 to fit within a slot of a stator core configured to receive four conductors each with a rectangular cross-section of about 4.5 mm×3.1 mm.

While the insulation tube 50 has been described with one exemplary embodiment in FIGS. 4 and 5, it will be appreciated that in other embodiments the insulation tube may be provided in different forms. For example, although the insulation tube 50 has a rectangular cross-section in the embodiment of FIGS. 4 and 5, the insulation tube 50 has a circular cross-section in the embodiment of FIGS. 6 and 7. In other embodiments, the insulation tube may have other cross-sectional shapes, such as a square or oval cross-section. Additionally, although the tubular slot liner 42 includes multiple channels (i.e., four channels 58a-d) in the embodiment of FIGS. 4 and 5, the tubular slot liner 42 includes only one channel in the embodiment of FIGS. 6 and 7. Similarly, while the insulation tube 50 in the embodiment of FIGS. 4 and 5 shows four channels, it will be appreciated that the insulation tube of FIGS. 4 and 5 may be constructed with more or less channels, such as six channels, two channels, or only a single channel. Accordingly, in different embodiments, the tubular slot liners 42 may include different numbers of channels.

Figure 8A:
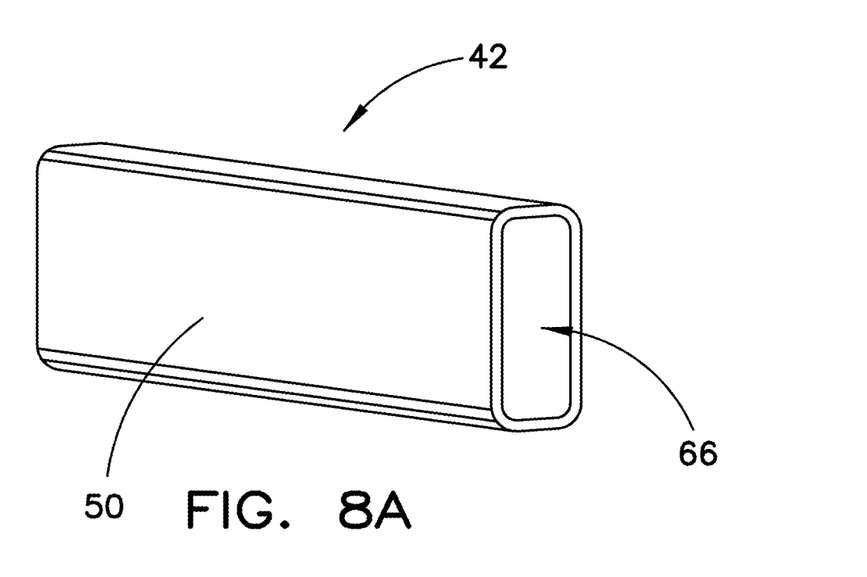
FIG. 8A shows a perspective view of another embodiment of the insulation tube of FIG. 5.
Figure 8B:
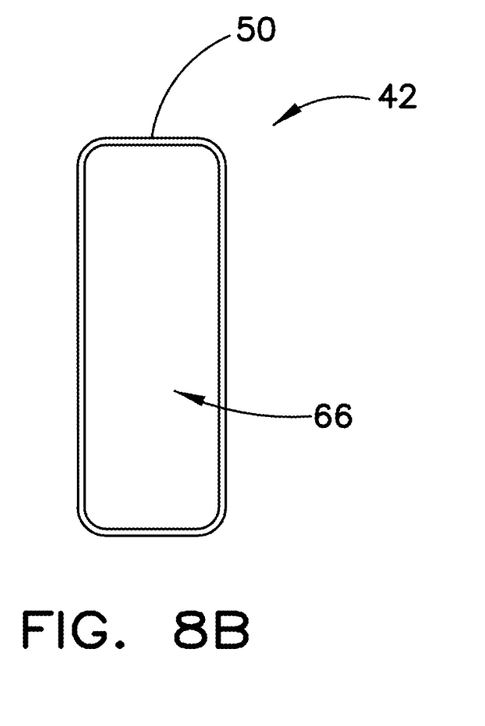
FIG. 8B shows a cross-sectional view of the insulation tube of FIG. 8A.
Figure 9:
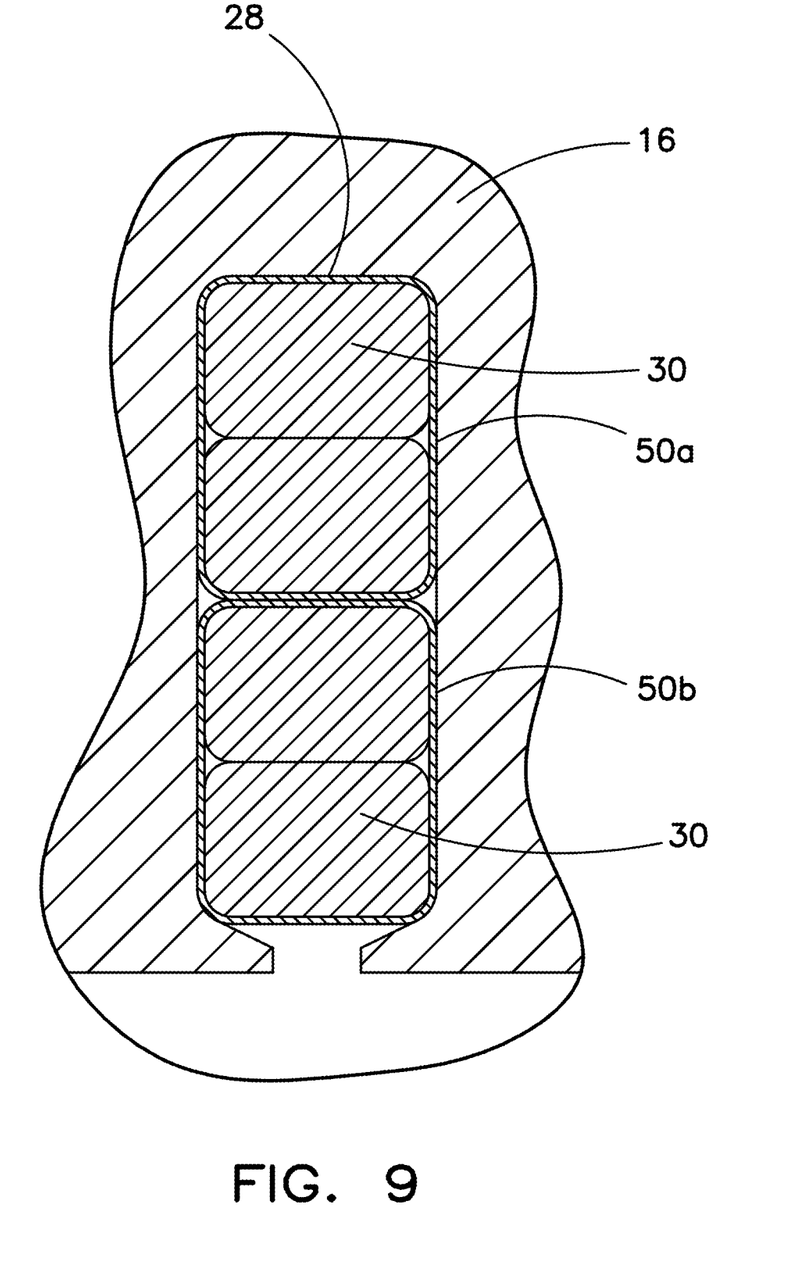
FIG. 9 shows a cross-sectional view of a slot with another embodiment of the insulation tube of FIG. 5 positioned in the slot.

Different embodiments of the slot liner utilized in an electric machine 10 may depend at least in part on the particular winding arrangement used, including the positions of the various conductors 30 within the slots 28 and the respective phase that they represent in a multi-phase machine. For example, in the embodiment of FIGS. 8A and 8B, the tubular slot liner 42 includes only a single channel 66 and all conductors in the slot may be positioned in the single channel 66 and associated with a single phase in the multi-phase machine. However, in the embodiment of FIG. 9, the two single channel tubular slot liners 50a and 50b are used in a single slot 28 to isolate two different groups of multiple conductors, where each group of conductors is associated with a different phase in the multi-phase machine. Alternatively, the two single channel slot liners 50a and 50b in the slot 28 of FIG. 9 may be substituted for a single multi-channel slot liner that resembles the embodiment of FIGS. 4 and 5, but includes only two channels instead of four channels 58.

Figure 10:
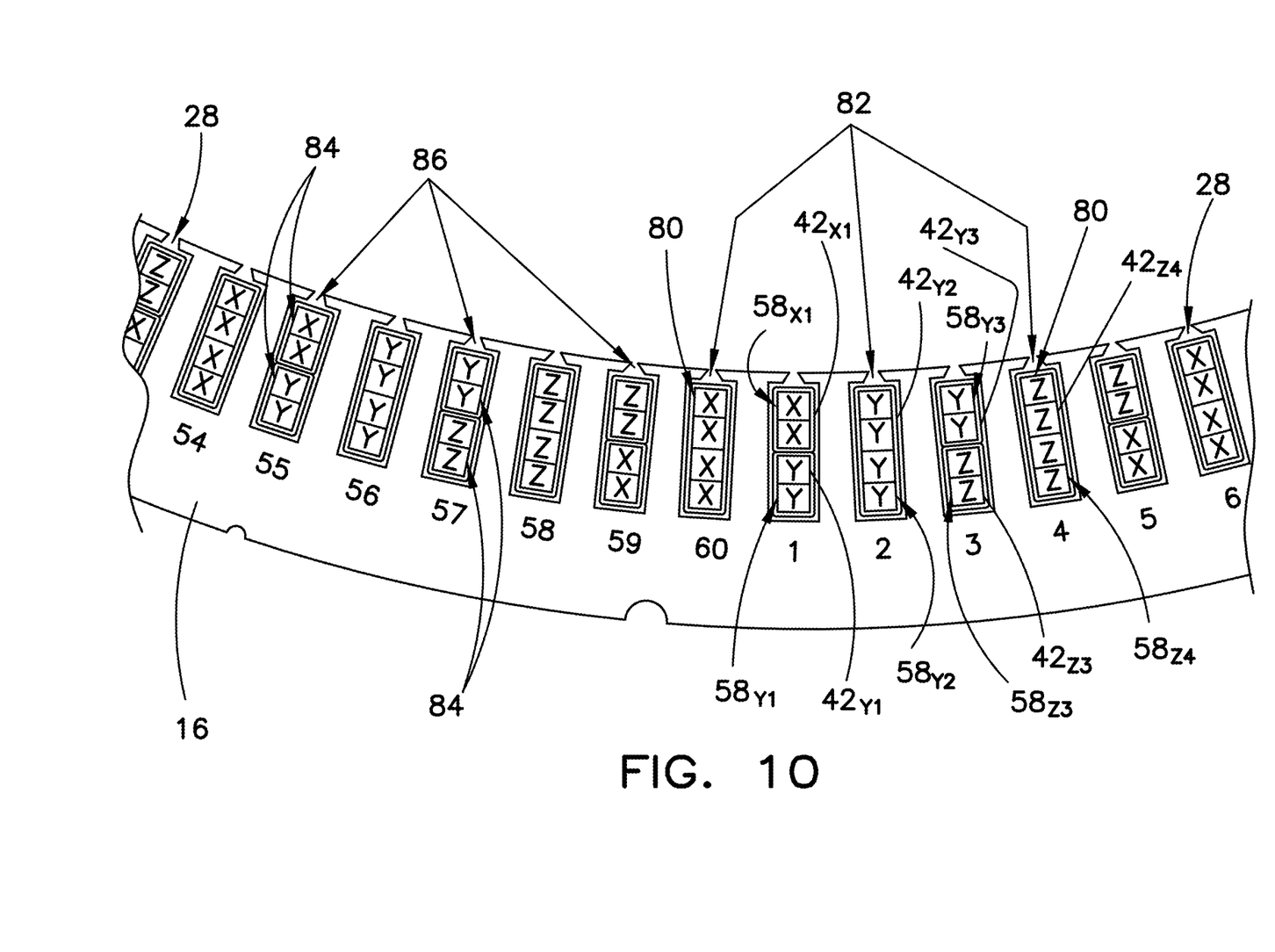
FIG. 10 shows a cross-sectional illustration of a portion of a stator core with differing quantities of slot liner channels in each of the plurality of slots

With reference now to FIG. 10, in at least one embodiment the tubular slot liners 42 may be arranged on the stator core 16 such that differing quantities of slot liners 42 and/or slot liner channels 58 are provided in the slots 28. In such an embodiment, the quantity of slot liner channels 58 may change from one slot 28 to an adjacent slot. For example, in the embodiment of FIG. 10, the quantity of slot liners 42 and slot liner channels 58 used in each slot 28 is equal to the number of different phases of the winding arrangement 18 within the particular slot. The number of slot liners 42 and associated slot liner channels 58 differs from slot-to-slot in the embodiment of FIG. 10 (i.e. one or two slot liners in each slot), even though an equal number of conductors 30 are positioned in each of the slots 28 of a stator core 16.

With the phase belt pattern of FIG. 10, each slot has four conductors 30. Each conductor 30 shown in FIG. 10 is labeled with one of phases X, Y or Z of a three phase winding arrangement, indicating that the conductor is associated with that phase in the winding arrangement. The phase belt pattern for the winding arrangement of FIG. 10 follows a 2-4-2 pattern. In other words, for a given phase of the winding arrangement, if two conductors associated with that phase are positioned in a given slot, four conductors associated with that phase will be positioned in an adjacent slot, and two conductors associated with that phase will be positioned in the next slot. Thus, in FIG. 10, two Y-phase conductors are positioned in slot #1, four Y-phase conductors are positioned in slot #2, and two Y-phase conductors are positioned in slot #3. Similarly, two Z-phase conductors are positioned in slot #3, four Z-phase conductors are positioned in slot #4, and two Z-phase conductors are positioned in slot #5.

As noted above, with the winding arrangement of FIG. 1, the quantity of slot liners 42 and slot liner channels 58 used in each slot 28 is equal to the number of different phases of the winding arrangement 18 within the particular slot. This can be seen by observing slot #s 1-4. In slot #1 there are two conductors of Phase Y (i.e., two conductors associated with Phase Y) and two conductors of Phase Z. Accordingly, there are two different slot liners and slot liner channels used in this slot #1, including a first slot liner $42_{X1}$ and a second slot liner $42_{Y1}$. The first slot liner $42_{X1}$ provides a first slot liner channel $58_{X1}$, and the conductors of Phase X are positioned in the slot liner channel $58_{X1}$. The second slot liner $42_{Y1}$ provides a second slot liner channel $58_{Y1}$, and the conductors of Phase Y are positioned in the slot liner channel $58_{Y1}$. Thus, in slot #1, the conductors of Phase Y are positioned in a different slot liner channel than the conductors of Phase X.

In slot #2, there are four conductors which are all of Phase Y. Thus there is only one slot liner channel $58_{Y2}$ required in this slot #2, which is provided by a single slot liner $42_{Y2}$, since all conductors 30 are the same phase.

In slot #3, there are two conductors of Phase Y and two conductors of Phase Z. Similar to slot #1, there are two different slot liner channels in slot #3 which are provided by two different slot liners. The conductors of Phase Y are positioned in a first slot liner channel $58_{Y3}$ which is provided by slot liner $42_{Y3}$, and the conductors of Phase Z are positioned in the second slot liner channel and $58_{Z3}$ which is provided by slot liner $42_{Z3}$.

In slot #4, all four conductors are of Phase Z. Similar to slot #2, there is only one slot liner $42_{Z4}$ and one slot liner channel $58_{Z4}$ required in this slot #4, since all conductors 30 are the same phase.

As noted above, the quantity of slot liner channels in slots one through four is 1-2-1-2, with each slot having one slot liner channel adjacent to two slots having two slot liner channels. This 1-2-1-2 sequence of slot liner channels is repeated around the remainder of slots 28 of the stator core 16. With this repeating sequence of slot liner channels, every conductor of one phase is isolated from conductors of different phases and isolated from shorting to ground through the stator core.

The above-described arrangement of FIG. 10 results in a winding arrangement where only a single slot liner channel 80 is positioned in a first group of slots 82 (i.e., the even numbered slots) and multiple slot liner channels 84 are positioned in a second group of slots 86 (i.e., the odd numbered slots). In the embodiment of FIG. 10, the multiple slot liner channels 84 in the odd numbered slots are provided by multiple slot liners, but in other embodiments, the multiple slot liner channels 84 may be provided by a single slot liner, such as the slot liner of FIGS. 4 and 5.

One advantage of the pattern of slot liner channels described above with respect to FIG. 10 is that the part count of required slot liners can be reduced by at least 25%. In particular, only three slot liners are required in slots #1 and #2 in FIG. 10 (i.e., two slot liners $42_{X1}$ and $42_{Y1}$ in slot #1, plus one slot liner $42_{Y2}$ in slot #2), instead of the four slot liners that would be required if the same number slot liners were provided in each channel (e.g., two slot liners in slot #1 plus two slot liners in slot #2). The part count may be even further reduced if the slots with two slot liner channels are provided by a single slot liner with multiple channels (e.g., a single multi-channel slot liner in slot #1). In any event, by varying the quantity of slot liner channels in each slot, the electric machine may be assembled in a more efficient manner and at a reduced cost. The reduced cost is in part contributed to the fact that there is less material used in at least some of the slots. This is due to the elimination of the "double" layer of liner material that exists when two or more tubes are placed in the same slot. Additionally, for a given electric machine design that has maximized the copper slot fill, the installation of conductors in the slots with a single tube is easier, thus reducing the opportunity for a mis-build. This is because there is more room for the copper in the slot, which also allows for additional clearance between the conductor and the slot liner.

A method of assembling a stator for an electric machine, such as an electric machine for a hybrid electric vehicle, is now described using the tubular slot liner described above. The method comprises inserting a plurality of insulation tubes 50 into a plurality of slots 28 in a stator core 16. Next, a plurality of electric conductors 30 are inserted into the plurality of insulation tubes 50 in the slots 28 of the stator core 16 such that in-slot portions 32, 33 of the plurality of conductors 30 are positioned in the plurality of slots 28. Each of the plurality of electric conductors 30 further includes a U-turn portion 31 extending between two in-slot portions 32, 33 and connection ends 34, 35 extending from the in-slot portions 32, 33. The connection ends 34, 45 extend from an opposite end of the stator core 16 from the U-turn portion 31. The method further includes joining adjacent connection ends 32, 33 of the plurality of electric conductors to form a winding arrangement on the stator core 16.

In at least one embodiment associated with the arrangement of FIG. 10, a method of making an electric machine includes inserting the slot liners 42 which provide slot liner channels 58 into the slots 28 of a stator core 16 such that a first number of slot liner channels is positioned in a first group of slots and a second number of slot liner channels is positioned in a second group of slots, with the first number different than the second number. For example, with reference to FIG. 10, only a single slot liner channel 80 may be positioned in a first group of slots 82 (e.g., the even numbered slots) and dual slot liner channels 84 may be positioned in a second group of slots 86 (e.g., the odd numbered slots). After the slot liners are inserted into the stator core, the conductors are inserted into the plurality of slot liner channels such that an equal number of conductors are provided in each slot. The conductors are inserted into the slots of the stator core such that in-slot portions of the plurality of conductors are positioned in the slot liner channels, U-turn portions extend from one end of the stator core, and connection ends extend from an opposite end of the stator core. With the conductors positioned in the slots, the adjacent connection ends of the plurality of conductors are joined to complete the winding arrangement on the stator.

It will be recognized that the method may be performed with different types of slot liners. For example, in one embodiment such as that of FIG. 9, each tubular slot liner 50*a*, 50*b* provides only a single slot liner channel, such that multiple slot liners are required in the slot to provide multiple slot liner channels. In other embodiments, such as that associated with FIG. 4, a single slot liner 50 may be used to provide multiple slot liner channels in a slot. Accordingly, a single slot liner with two slot liner channels may be used in the odd numbered slots 86 in the arrangement of FIG. 10. Moreover, while the embodiment of FIG. 10 has been described as using tubular slot liners in the form of insulation tubes 50, in other embodiments, the slot liners may be more traditional slot liners, such as those shown in FIGS. 11A and 11B, where the slot liner channels formed by the insulation material may or may not provide fully closed slot liner channels (i.e. the slot liner channels may have openings along the length of the channel). Accordingly, the term "slot liner channel" as used herein is not limited to tubular slot liners.

The foregoing detailed description of one or more embodiments of the conductor insulation arrangement has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. An electric machine comprising:
    a core with a plurality of slots;
    a multi-phase winding arrangement positioned on the core, the winding arrangement including an equal number of conductors positioned in each of the plurality of slots, each of the plurality of conductors associated with a phase of the multi-phase winding arrangement, wherein the conductors in a first group of slots are associated with a first number of phases of the multi-phase winding arrangement, and wherein the conductors in a second group of slots are associated with a second number of phases of the multi-phase winding arrangement; and
    at least one slot liner with at least one slot liner channel positioned in each of the plurality of slots, wherein the number of slot liner channels in the first group of slots is equal to the first number of phases associated with the first group of slots, and wherein the number of slot liner channels in the second group of slots is equal to the second number of phases associated with the second group of slots, wherein the number of phases in the plurality of slots alternates between one and two for each successive slot of the plurality of slots such that the number of phases alternates in a one-two-one-two pattern.

2. The electric machine of claim 1 wherein the multi-slot winding arrangement is a three-phase winding arrangement, wherein the first number of phases is one phase of the three-phase winding arrangement, and wherein the second number of phases is two phases of the three-phase winding arrangement.

3. The electric machine of claim 1 wherein the number of slot liners in each of the plurality of slots is equal to the number of slot liner channels in the slot.

4. The electric machine of claim 1 wherein each of the plurality of slot liners is an insulation tube including only a single channel.

5. The electric machine of claim 1 wherein each of the plurality of conductors includes a U-turn portion extending between two in-slot portions and connection ends extending from the in-slot portions, wherein the conductors are positioned in the slots such that the connection ends extend from an opposite end of the core than the U-turn portions, and wherein the in-slot portions of the conductors extend through the slot liner channels.

6. The electric machine of claim 5 wherein multiple in-slot portions extend through each of the plurality of channels.

7. The electric machine of claim 5 wherein each of the plurality of slot liners is void of openings between the in-slot portions of the conductors and the core.

8. The electric machine of claim 1 wherein each of the plurality of slot liners is comprised of polyimide film.

9. The electric machine of claim 1 wherein the number of conductors in each of the plurality of slots is four.

10. A method of making an electric machine comprising:
inserting slot liners into slots of a stator core, each slot liner providing at least one slot liner channel, wherein the slot liners are inserted into the slots of the stator core such that a first number of slot liner channels is positioned in a first group of slots and a second number of slot liner channels is positioned in a second group of slots, wherein the first number is different than the second number, wherein successive slots of the stator core alternate between the first group of slots and the second group of slots;
inserting a plurality of conductors into the plurality of slot liner channels, wherein the plurality of conductors inserted into each of a plurality of the slots of the stator core are associated with different winding phases; and
joining adjacent connection ends of the plurality of conductors.

11. The method of claim 10 wherein the plurality of conductors are inserted into the slot liners such that in-slot portions of the plurality of conductors are positioned in the slot liner channels, and wherein each of the plurality of conductors includes a U-turn portion extending between two in-slot portions and the connection ends extend from the in-slot portions, the connection ends extending from an opposite end of the stator core from the U-turn portions.

12. The method of claim 10 wherein each slot liner provides only a single slot liner channel.

13. The method of claim 10 wherein inserting the plurality of conductors into the plurality of slot liner channels comprises inserting at least two conductors into each of the plurality of slot liner channels.

14. The method of claim 10 wherein an equal number of conductors is positioned in each of the plurality of slots after the plurality of conductors are inserted into the plurality of slot liner channels.

15. The method of claim 14 wherein the number of conductors positioned in each of the plurality of slots is four and wherein the first number of slot liner channels in the first group of slots is one and the second number of slot liner channels in the second group of slots is two.

16. An electric machine comprising:
a core with a plurality of slots;
a multiphase winding provided on the core, the multiphase winding including a plurality of conductors positioned in each of the plurality slots, each of the plurality of conductors having a rectangular cross-sectional shape defining four sides; and
at least one slot liner positioned in each of the plurality of slots, each slot liner providing at least one slot liner channel in each of the plurality of slots, and each of the plurality of conductors extending through one of the slot liner channels with at least two of the four sides contacting the slot liner, wherein differing quantities of slot liner channels are provided in the plurality of slots and at least two different phases of the multiphase winding are associated with slots having at least two slot liner channels.

17. The electric machine of claim 16 wherein the differing quantities of slot liner channels are provided in the plurality of slots in a repetitive sequence.

18. The electric machine of claim 17 wherein the repetitive sequence is one-two-one-two such that each slot having one slot liner channel is adjacent to two slots having two slot liner channels.

19. The electric machine of claim 18 wherein four conductors are positioned in each of the plurality of slots, wherein each of the four conductors in the slots having one slot liner channel are associated with a single phase of the multi-phase winding arrangement, wherein a first pair of conductors in the slots having two slot liner channels are associated with a first phase of the multi-phase winding arrangement, and wherein a second pair of conductors in the slots having two slot liner channels are associated with a second phase of the multi-phase winding arrangement.

20. The electric machine of claim 18 wherein the core is a stator core of a vehicle electric machine.

* * * * *